US011815496B2

(12) United States Patent
Li et al.

(10) Patent No.: US 11,815,496 B2
(45) Date of Patent: Nov. 14, 2023

(54) ROCK MECHANICS TRIAXIAL TESTING MACHINE HAS SHAFT PRESSURE DRIVING PIECE AND LIFTING MECHANISM DRIVING INNER PRESSURE CHAMBER TO LIFT

(71) Applicant: INSTITUTE OF GEOLOGY AND GEOPHYSICS, CHINESE ACADEMY OF SCIENCES, Beijing (CN)

(72) Inventors: Shouding Li, Beijing (CN); Xiao Li, Beijing (CN); Zhongming Zhou, Beijing (CN); Bo Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 115 days.

(21) Appl. No.: 17/480,772

(22) Filed: Sep. 21, 2021

(65) Prior Publication Data
US 2022/0128441 A1  Apr. 28, 2022

(30) Foreign Application Priority Data

Oct. 27, 2020 (CN) .......................... 202011165010.2

(51) Int. Cl.
*G01N 3/12* (2006.01)
*G01N 3/36* (2006.01)
*G01N 3/08* (2006.01)

(52) U.S. Cl.
CPC ................. *G01N 3/12* (2013.01); *G01N 3/36* (2013.01); *G01N 2203/0019* (2013.01); *G01N 2203/0048* (2013.01); *G01N 2203/0256* (2013.01)

(58) Field of Classification Search
CPC .... G01N 3/12; G01N 3/36; G01N 2203/0019; G01N 2203/0048; G01N 2203/0256;
(Continued)

(56) References Cited

U.S. PATENT DOCUMENTS

2008/0184580 A1   8/2008  Secq
2015/0061669 A1*  3/2015  Hakimuddin .......... G01R 33/28
                                                        324/309
(Continued)

FOREIGN PATENT DOCUMENTS

CN         101504356 A      8/2009
CN         102135478 A      7/2011
(Continued)

OTHER PUBLICATIONS

European Search Report for EP Application No. 21194962.3. (dated Feb. 10, 2022).

*Primary Examiner* — Brandi N Hopkins
(74) *Attorney, Agent, or Firm* — Merchant & Gould P.C.

(57) ABSTRACT

A rock mechanics triaxial testing machine includes an outer pressure chamber and an inner pressure chamber located inside the outer pressure chamber, and a side wall of the inner pressure chamber is provided with a communication hole communicating with the outer pressure chamber; an upper pressure head and a lower pressure head which may be placed inside the inner pressure chamber; an axial pressure driving member, the axial pressure driving member may drive the upper pressure head and lower pressure head to approach each other to squeeze the rock sample; an axial deformation sensor, a radial deformation sensor, a lifting mechanism, the lifting mechanism may drive the inner pressure chamber to rise and fall. In the rock mechanics triaxial testing machine, the inner pressure chamber and the outer pressure chamber are nested indoors and outdoors, and (Continued)

the inner pressure chamber is used to quickly mount rock test samples.

11 Claims, 10 Drawing Sheets

(58) Field of Classification Search
CPC ............. G01N 29/07; G01N 2291/011; G01N 2291/0232; G01N 1/44; G01N 29/14; G01N 3/02
See application file for complete search history.

(56) References Cited

U.S. PATENT DOCUMENTS

| | | | | |
|---|---|---|---|---|
| 2018/0335494 | A1* | 11/2018 | Hakimuddin | ...... G01N 33/2888 |
| 2019/0331569 | A1 | 10/2019 | Liu et al. | |
| 2021/0140861 | A1 | 5/2021 | Zhang et al. | |

FOREIGN PATENT DOCUMENTS

| | | |
|---|---|---|
| CN | 102539244 A | 7/2012 |
| CN | 102890033 A | 1/2013 |
| CN | 103076268 A | 5/2013 |
| CN | 203287261 U | 11/2013 |
| CN | 203365248 U | 12/2013 |
| CN | 103645096 A | 3/2014 |
| CN | 107290222 A | 10/2017 |
| CN | 107941615 A | 4/2018 |
| CN | 108020470 A | 5/2018 |
| CN | 108106943 A | 6/2018 |
| CN | 109916722 A | 6/2019 |
| CN | 110186773 A | 8/2019 |
| CN | 108362551 B | 7/2020 |
| CN | 211148301 U | 7/2020 |
| FR | 2566531 A1 | 12/1985 |
| JP | 2000-81378 A | 3/2000 |

* cited by examiner

ROCK MECHANICS TRIAXIAL TESTING MACHINE HAS SHAFT PRESSURE DRIVING PIECE AND LIFTING MECHANISM DRIVING INNER PRESSURE CHAMBER TO LIFT

CROSS REFERENCE TO RELATED APPLICATIONS

This application claims the priorities to Chinese patent application No. 202011165010.2, titled "ROCK MECHANICS TRIAXIAL TESTING MACHINE", filed with the China National Intellectual Property Administration Oct. 27, 2020, the entire disclosure of which is hereby incorporated by reference.

FIELD

The present application relates to the technical field of rock mechanics testing, and in particular to a rock mechanics triaxial testing machine.

BACKGROUND

A rock mechanics triaxial testing system may reproduce the geological process and its state and structure changes on a small scale. The macro-mechanical characteristic parameters such as rock deformation and strength of the sample can be obtained by this system, which may provide a basis for the design of drilling engineering and fracturing engineering. However, an existing rock mechanics triaxial testing system is located indoors, which is far away from the sampling site and has the problems of complex test operation, long test time and low test efficiency. For example, in the process of shale gas exploration and development, the drilled shale core may undergo structural collapse and failure within one to two days, which may not meet the requirements of obtaining accurate rock physical and mechanical parameters in the laboratory. Therefore, it is necessary to develop a rock mechanics triaxial testing system, which is suitable for drilling engineering and fracturing engineering, and may obtain rock mechanics parameters quickly and accurately.

In order to realize the convenient transportation of rock mechanics triaxial testing system between different well sites and complete rock mechanics test quickly, it is necessary to innovate the structure of rock mechanics triaxial testing system to realize the miniaturization and convenient operation for the rock mechanics triaxial testing system.

SUMMARY

In view of this, a rock mechanics triaxial testing machine is provided by the present application, which adopts a nested pressure chamber structure having an outer pressure chamber and an inner pressure chamber, thus reducing the time for mounting test samples and greatly improving the test efficiency.

The following technical solutions are provided according to the present application.

A rock mechanics triaxial testing machine, includes:
an outer pressure chamber and an inner pressure chamber located inside the outer pressure chamber, and a side wall of the inner pressure chamber is provided with a communication hole communicating with the outer pressure chamber;
an upper pressure head and a lower pressure head which are placeable inside the inner pressure chamber;
an axial pressure driving member, the axial pressure driving member is configured to drive the upper pressure head and lower pressure head to approach each other for squeezing the rock sample;
an axial deformation sensor for detecting axial compressed deformation of the rock sample;
a radial deformation sensor for detecting radial expansive deformation of the rock sample;
a lifting mechanism, which is configured to drive the inner pressure chamber to rise and fall.

Preferably, in the rock mechanics triaxial testing machine, the lifting mechanism includes:
a lifting rod, and a lower end of the lifting rod is fixedly connected with a top of the inner pressure chamber;
a lifting drive member, and the lifting drive member may drive the lifting rod to rise and fall.

Preferably, the rock mechanics triaxial testing machine further includes a connecting plate, and the lifting rod and an output end of the lifting drive member are fixedly connected with the connecting plate.

Preferably, the rock mechanics triaxial testing machine further includes a guide post passing through the connecting plate, and the connecting plate slides along the guide post when the connecting plate rises and falls;
the lifting drive member is a lifting oil cylinder.

Preferably, in the rock mechanics triaxial testing machine, an upper end of the outer pressure chamber has an internal threaded hole, and the rock mechanics triaxial testing machine further includes a rotating nut matched with the internal threaded hole, the rotating nut is provided with a central through hole, and the lifting rod is in threaded fit with the central through hole of the rotating nut.

Preferably, the axial deformation sensor includes an axial rod end and an axial sleeve end. The axial rod end is fixed to the upper pressure head, and the axial sleeve end is fixed to the lower pressure head. When the rock sample is squeezed, the upper pressure head and the lower pressure head are approaching each other, which makes the axial rod end and the axial sleeve end approach each other, thus, a position of an axial rod in an axial sleeve is varied, and the axial compressed deformation is calculated according the position variation.

Preferably, the radial deformation sensor includes a chain, a radial rod end, and a radial sleeve end. When the rock sample is squeezed, the rock sample expends in a radial direction, and the radial expansive deformation is calculated according the expending deformation.

Preferably, in the rock mechanics triaxial testing machine, a ball joint is provided on a top wall of the inner pressure chamber; a load sensor is provided between the ball joint and the top wall of the inner pressure chamber;

The communication hole may be rectangular, round or oval, and the thermoplastic pipe encapsulating the upper pressure head, the rock sample and the lower pressure head may be put into or taken out of the inner pressure chamber through the communication hole.

Preferably, in the rock mechanics triaxial testing machine, an axial pressure through hole is defined on a bottom wall of the inner pressure chamber.

The axial pressure driving member includes a telescopic oil cylinder, and a piston of the telescopic oil cylinder may pass through the axial pressure through hole to squeeze the lower pressure head.

Preferably, in the rock mechanics triaxial testing machine, one of an end of the piston of the telescopic oil cylinder and a bottom end of the lower pressure head is provided with a positioning protrusion and the other end of the end of the piston of the telescopic oil cylinder and the bottom end of the lower pressure head is provided with a positioning groove.

Preferably, in the rock mechanics triaxial testing machine, the axial pressure driving member further includes a displacement sensor for detecting the displacement of the piston.

Preferably, in the rock mechanics triaxial testing machine, a damping pad is arranged at the bottom of the rock mechanics triaxial testing machine.

When the rock mechanics triaxial testing machine provided by the above embodiments is applied, the upper pressure head, the rock sample and the lower pressure head are all encapsulated in the thermoplastic pipe, and the rock sample is located between the upper pressure head and the lower pressure head, and then the thermoplastic pipe is placed in the inner pressure chamber. In addition, the upper pressure head, the rock sample and the lower pressure head are sequentially arranged along the vertical direction after being placed in the inner pressure chamber; the rock sample is mounted with the axial extensometer and the radial extensometer before being encapsulated, and the axial extensometer and the radial extensometer are used for detecting the axial and radial deformation of the rock sample. Then, the inner pressure chamber is placed inside the outer pressure chamber, and the upper pressure head and the lower pressure head are driven close to each other by the axial pressure driving member to squeeze the rock sample, so as to provide the axial force of the rock sample in the test process. At the same time, a liquid is injected into the outer pressure chamber to provide confining pressure for the rock sample, so as to realize the mechanical triaxial test of the rock sample. After the test is completed, the lifting mechanism is used for driving the inner pressure chamber to rise, so that the inner pressure chamber is separated from the outer pressure chamber, and then the rock sample is taken out from the inner pressure chamber. Therefore, when using the rock mechanics triaxial testing machine provided by the present application, it is not necessary to repeatedly fill and drain the outer pressure chamber with liquid. Instead, the rock sample is taken and placed by taking out the inner pressure chamber from the outer pressure chamber, which greatly shortens the time for taking and placing the rock sample.

In the rock mechanics triaxial testing machine, the inner pressure chamber is nested the outer pressure chamber, and the inner pressure chamber is used for quickly mounting rock test samples. This design reduces the time for mounting rock test samples, reduces the time for filling and discharging liquid in the outer pressure chamber, and greatly improves the test efficiency. The outer pressure chamber is used for bearing the counterforce of axial pressure and confining compression. Compared with the pillar-type counterforce frame structure of the traditional rock mechanics triaxial testing system, this design ensures the counterforce mechanism to have sufficient rigidity and may greatly reduce the size of the counterforce mechanism. To sum up, the rock mechanics triaxial testing machine may realize the miniaturization for the rock mechanics triaxial testing system, facilitate the operation, reduce the test time and improve the test efficiency by more than 50%.

BRIEF DESCRIPTION OF THE DRAWINGS

To illustrate technical solutions according to the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by those skilled in the art based on those drawings without any creative effort.

Figure 1:
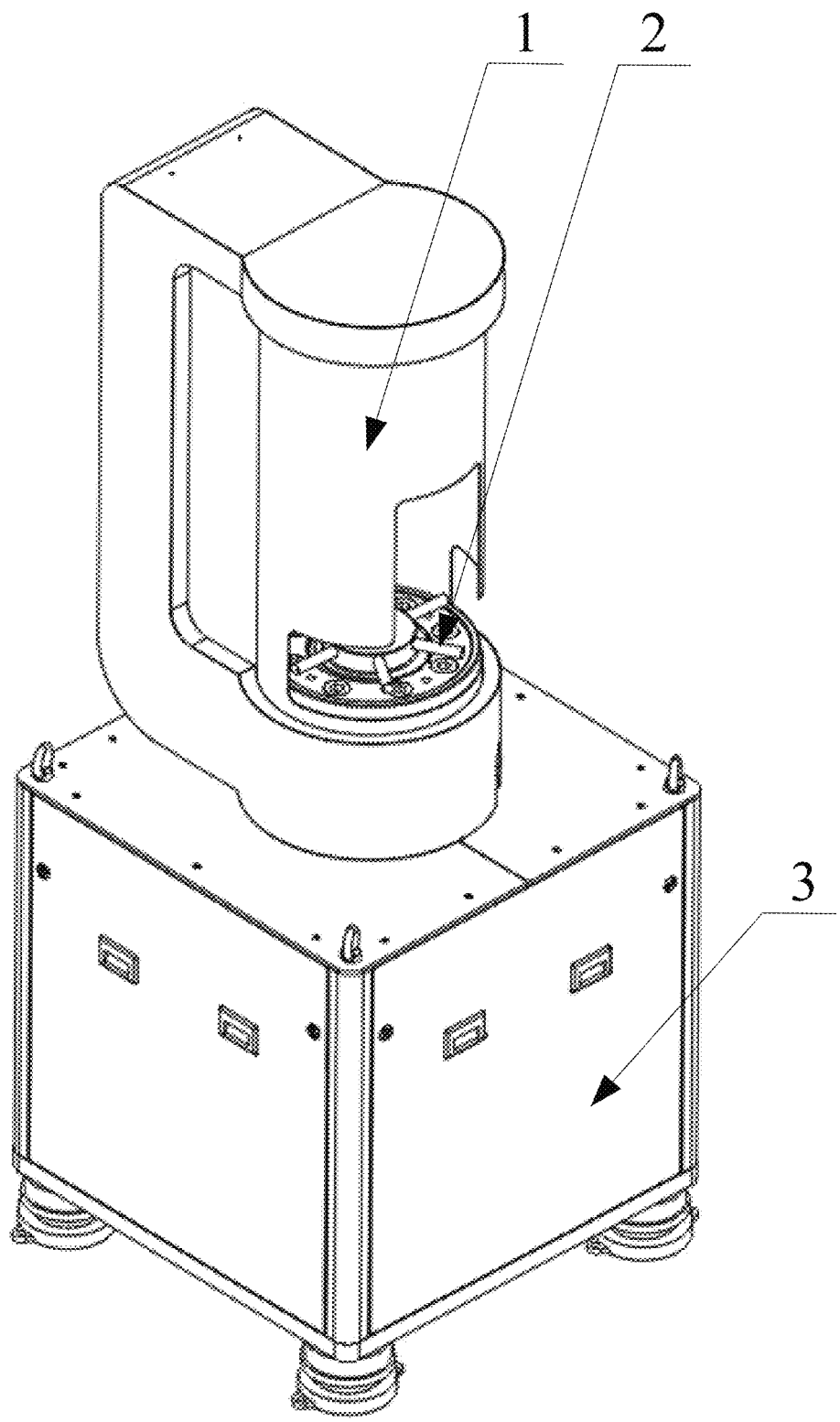
FIG. 1 is a schematic structural diagram of a rock mechanics triaxial testing machine provided by an embodiment of the present application.
Figure 2:
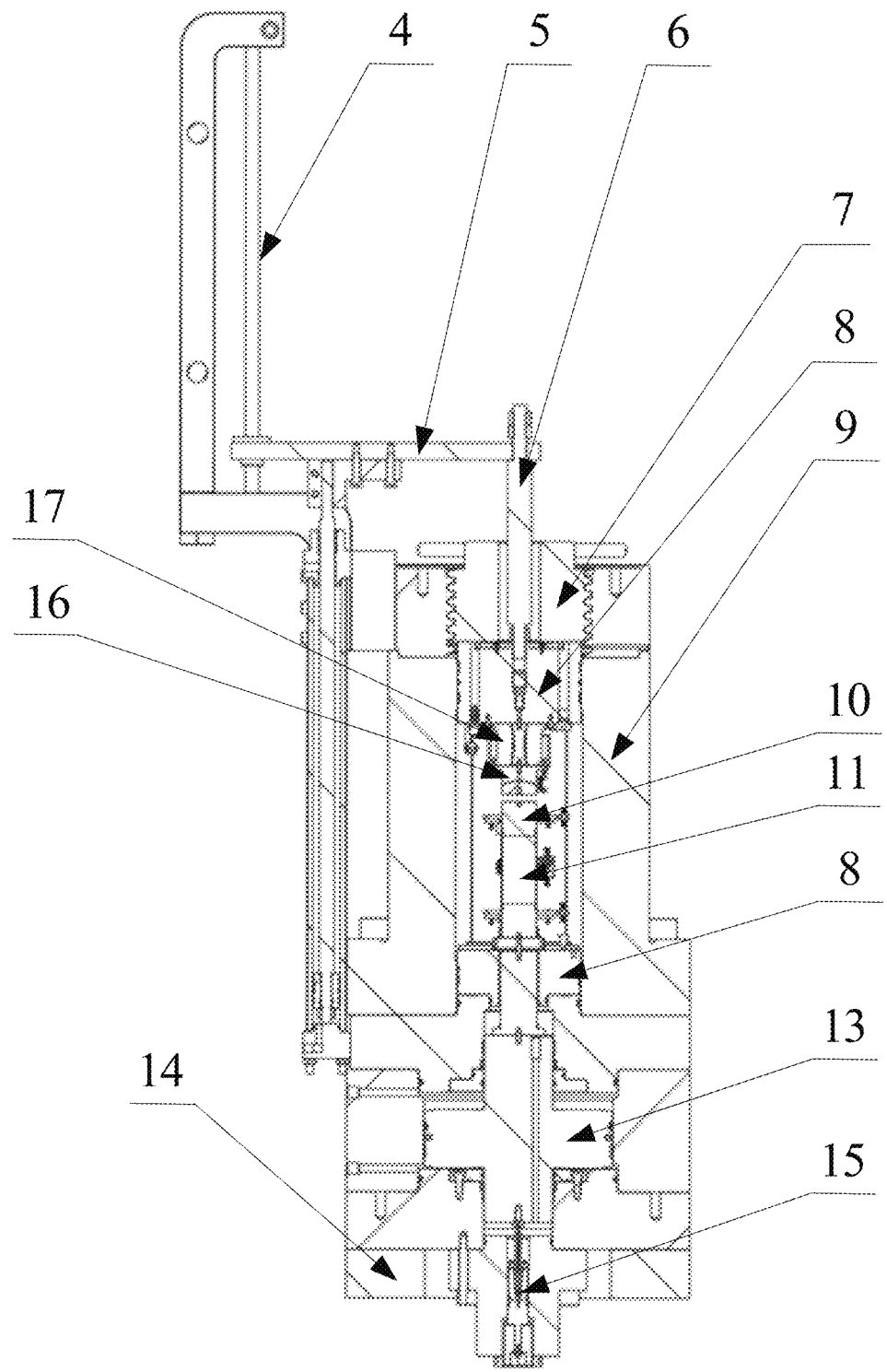
FIG. 2 is a sectional view of the base and the inside of the protective cover of the rock mechanics triaxial testing machine provided by the embodiment of the present application.
Figure 3:
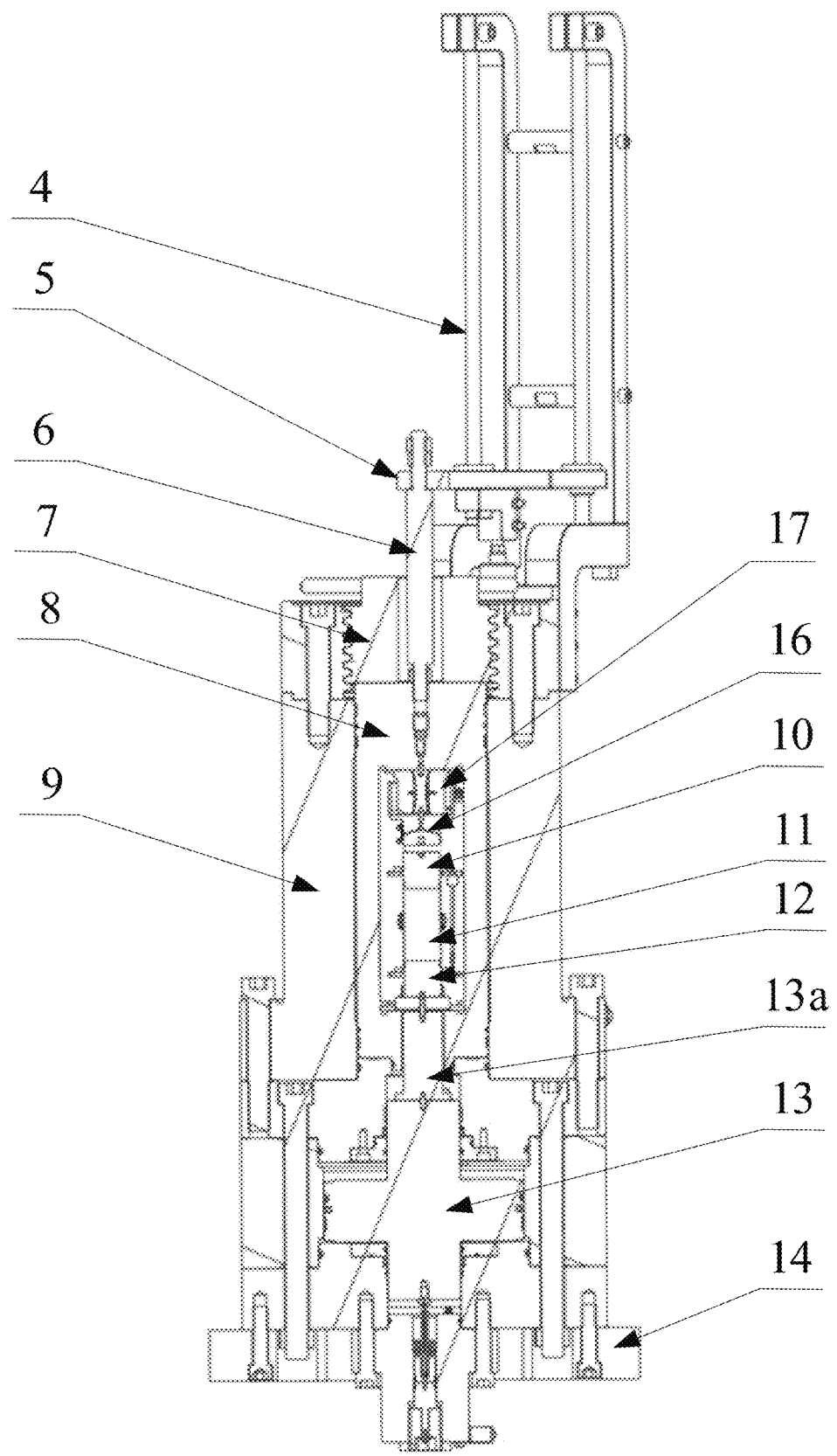
FIG. 3 is a cross-sectional view of the base and protective cover of the rock mechanics triaxial testing machine provided by the embodiment of the present application from another angle.
Figure 4:
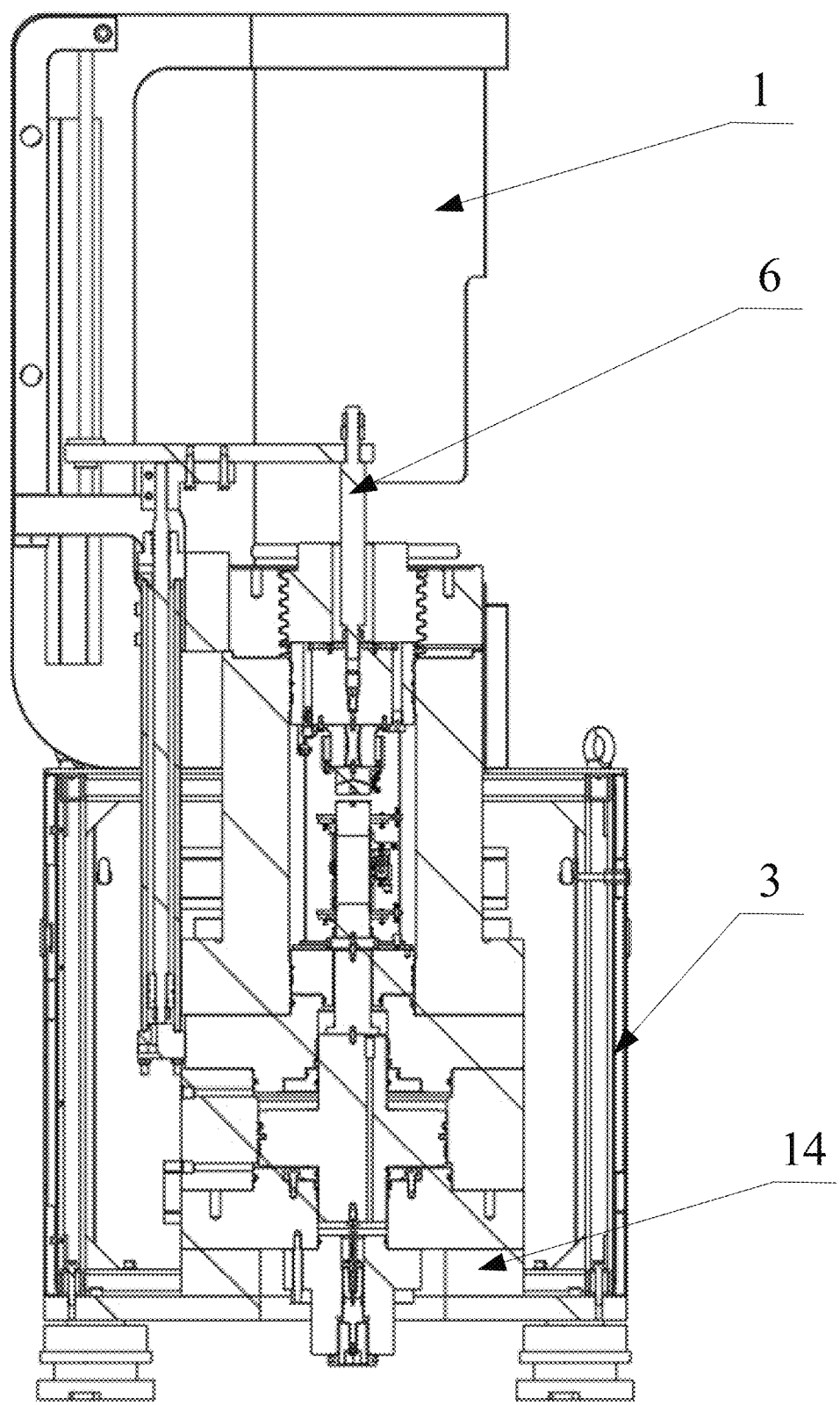
FIG. 4 is a sectional view of the rock mechanics triaxial testing machine provided by the embodiment of the present application.
Figure 5:
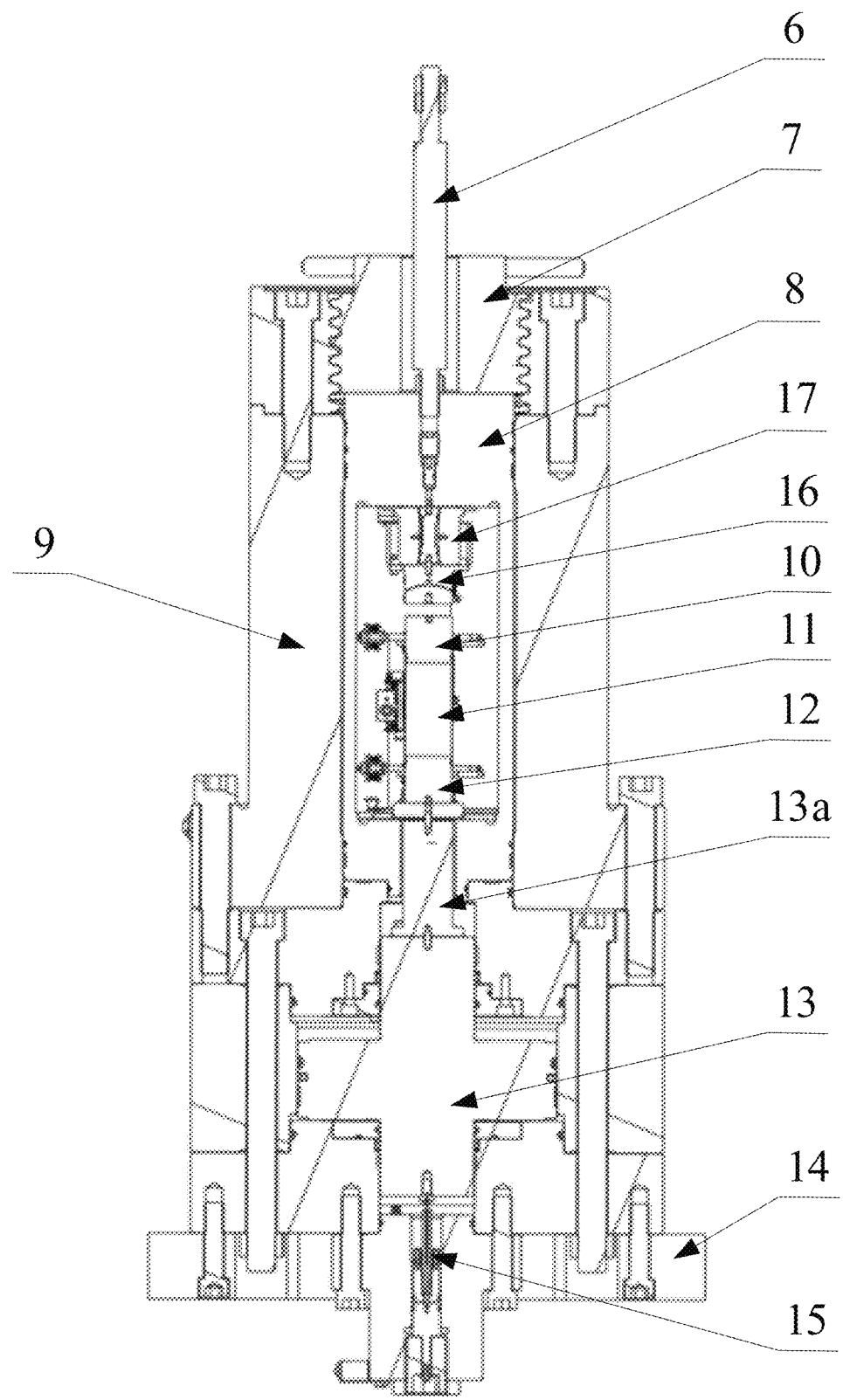
FIG. 5 is a partial sectional view of the rock mechanics triaxial testing machine provided by the embodiment of the present application.
Figure 6:
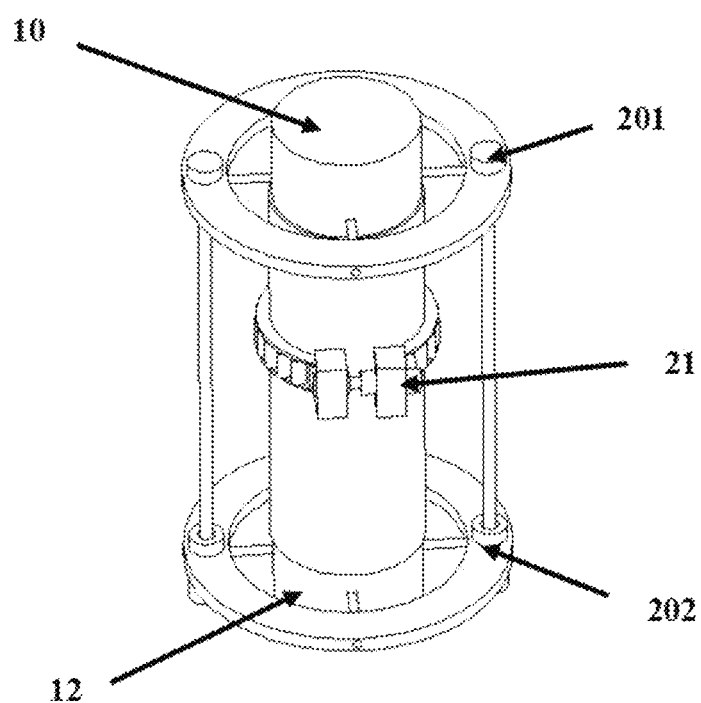
FIG. 6 is a schematic structural view of an upper pressure head, an lower pressure head, an axial deformation sensor, and a radial deformation sensor provided by the embodiment of the present application.
Figure 7:
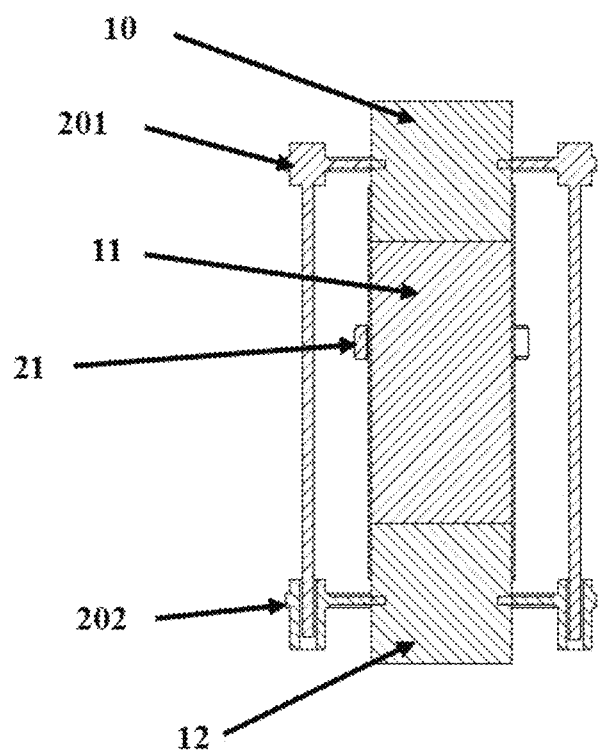
FIG. 7 is an axial section-view of the structure in FIG. 6.
Figure 8:
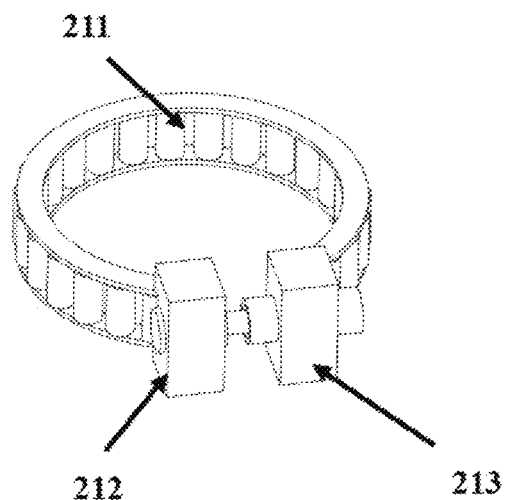
FIG. 8 is a schematic structural view of a radial deformation sensor provided by the embodiment of the present application.
Figure 9:
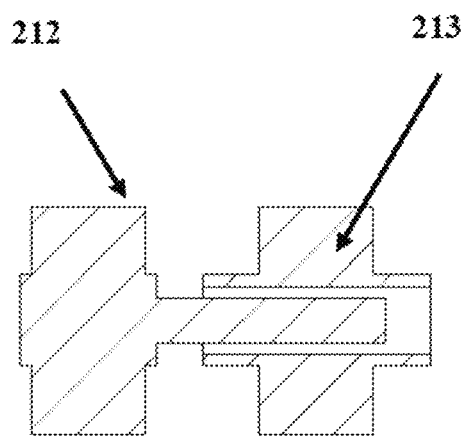
FIG. 9 is a sectional view of a radial rod end and a radial sleeve end, which are connected, of the radial deformation sensor provided by the embodiment of the present application.
Figure 10:
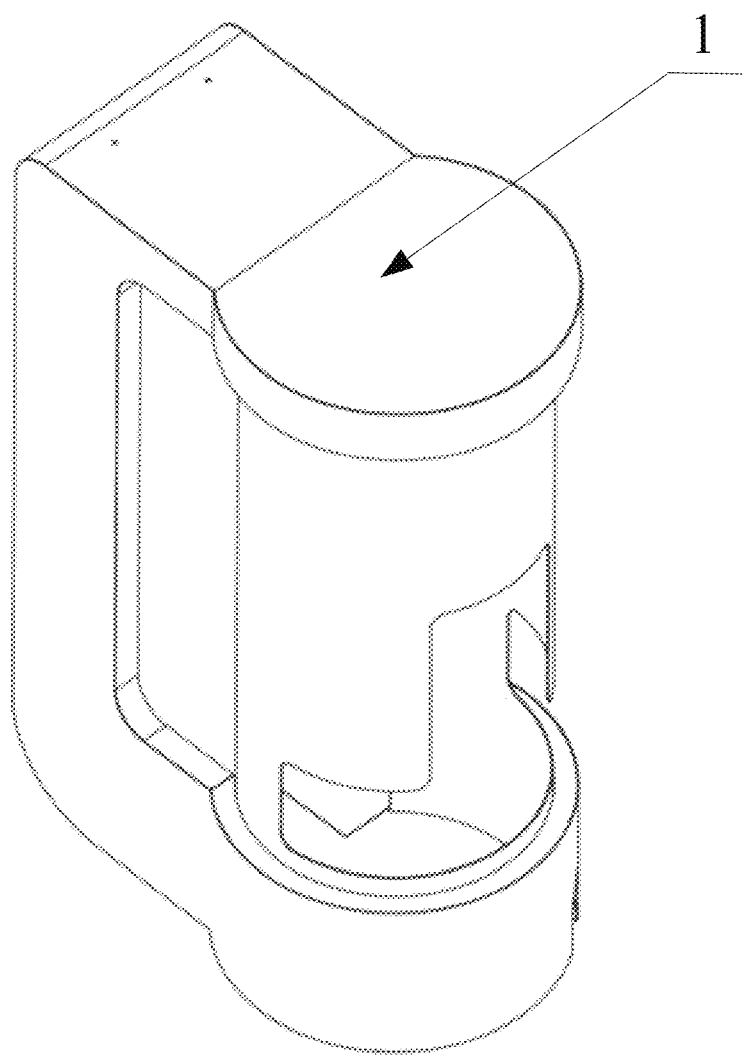
FIG. 10 is a schematic diagram of a protective cover provided by the embodiment of the present application.
Figure 11:
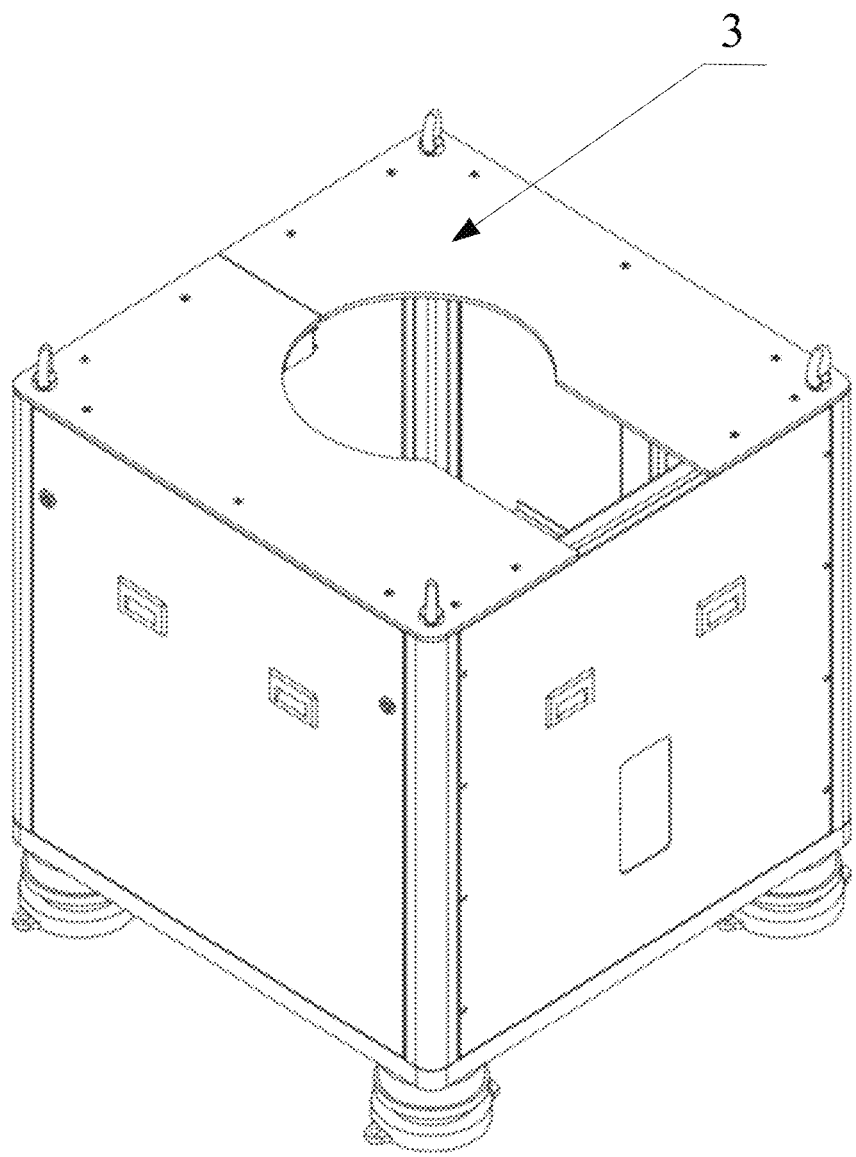
FIG. 11 is a schematic diagram of a support base provided by the embodiment of the present application.

| Reference numerals in FIGS. 1-11: | |
|---|---|
| 1 protective cover, | 2 rotating handle, |
| 3 support base, | 4 guide post, |
| 5 connecting plate, | 6 lifting rod, |
| 7 rotating nut, | 8 inner pressure chamber, |
| 9 outer pressure chamber, | 10 upper pressure head, |
| 11 rock sample, | 12 lower pressure head, |
| 13 piston, | 13a intermediate connector, |
| 14 damping pad, | 15 displacement sensor, |
| 16 ball joint, | 17 load sensor, |
| 20 axial deformation sensor, | 21 radial deformation sensor, |
| 201 axial rod end, | 202 axial sleeve end, |
| 211 chain, | 212 radial rod end, |
| 213 radial sleeve end. | |

DETAILED DESCRIPTION

A rock mechanics triaxial testing machine is provided by the present application, which adopts a nested pressure chamber structure having an outer pressure chamber and an inner pressure chamber, thus reducing the time for mounting test samples and greatly improving the test efficiency.

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments of the present disclosure, all of other embodiments, made by those skilled in the art without any creative efforts, fall into the scope of protection of the present disclosure.

In the description of the present application, it should be understood that an orientation or a position relation indicated by terms "upper", "lower", "front", "rear", "left", "right" or the like is described based on an orientation or a position relation shown in the drawings, and is only used for describing the present application and simplifying the description, rather than instructing or implying that a device or element related to the terms must have a specific orientation or be constructed and operated in a specific orientation. Therefore, the terms should be not construed as limitations of the present application. In addition, the terms "first", "second" and the like are for purpose of description, and should not be construed as indicating or implying relative importance.

Referring to FIGS. 1-11, the rock mechanics triaxial testing machine provided by the present application includes an outer pressure chamber 9, an inner pressure chamber 8, an upper pressure head 10, a lower pressure head 12, an axial deformation sensor 20, a radial deformation sensor 21, an axial pressure driving member and a lifting mechanism.

The inner pressure chamber 8 is located inside the outer pressure chamber 9, that is, the inner pressure chamber 8 is nested in the outer pressure chamber 9. A side wall of the inner pressure chamber 8 is provided with a communication hole for communicating with the outer pressure chamber 9. In other words, the communication hole is arranged on the side wall of the inner pressure chamber 8, and the communication hole penetrates the side wall of the inner pressure chamber 8, so that the interior of the inner pressure chamber 8 communicates with the interior of the outer pressure chamber 9.

The upper pressure head 10 and the lower pressure head 12 may both be placed inside the inner pressure chamber 8. Specifically, the upper pressure head 10, the rock sample 11 and the lower pressure head 12 are all encapsulated in a thermoplastic pipe, and the rock sample 11 is located between the upper pressure head 10 and the lower pressure head 12, and then the thermoplastic pipe is placed in the inner pressure chamber 8.

The axial deformation sensor 20 is configured to detect axial compressed deformation of the rock sample 11. The axial deformation sensor includes an axial rod end 201 and an axial sleeve end 202. The axial rod end 201 is fixed to the upper pressure head 10, and the axial sleeve end 202 is fixed to the lower pressure head 12. When the rock sample 11 is squeezed, the upper pressure head 10 and the lower pressure head 12 are approaching each other, which makes the axial rod end 201 and the axial sleeve end 202 approach each other, thus, a position of an axial rod in an axial sleeve is varied, and the axial compressed deformation is calculated according the position variation.

The radial deformation sensor 21 is configured to detect radial expansive deformation of the rock sample 11. The radial deformation sensor 21 includes a chain 211, a radial rod end 212, and a radial sleeve end 213. The chain 211 encloses the rock sample 11. When the rock sample 11 is squeezed, the rock sample 11 expends in a radial direction, which leads the chain 211 to expand outwards, making the radial rod end 212 and the radial sleeve end 213 move away from each other, thus, a position of a radial rod in a radial sleeve is varied, and the radial expansive deformation of the rock sample 11 is calculated according the expending deformation.

The axial pressure driving member may drive the upper pressure head 10 and the lower pressure head 12 to approach each other for squeezing the rock sample 11. Specifically, the axial pressure driving member drives the upper pressure head 10 and/or the lower pressure head 12 to move so that the upper pressure head 10 and the lower pressure head 12 approach each other. When the upper pressure head 10 and the lower pressure head 12 are close to each other, the rock sample 11 located between the upper pressure head 10 and the lower pressure head 12 may be squeezed.

The lifting mechanism may drive the inner pressure chamber 8 to rise and fall. Specifically, the lifting mechanism may drive the inner pressure chamber 8 to rise to pass through a top opening of the outer pressure chamber 9, and finally make the inner pressure chamber 8 separate from the outer pressure chamber 9. The lifting mechanism may further drive the inner pressure chamber 8 to descend, so that the inner pressure chamber 8 enters the outer pressure chamber 9.

When the rock mechanics triaxial testing machine provided by the above embodiments is applied, the upper pressure head 10, the rock sample 11 and the lower pressure head 12 are encapsulated in a thermoplastic pipe in a listed sequence from top to bottom, which forms an integrated encapsulation, that is, the rock sample 11 is disposed between the upper pressure head 10 and the lower pressure head 12. Then, the axial deformation sensor 20 and the radial deformation sensor 21 are mounted on the integrated encapsulation. Next, the integrated encapsulation mounted with the axial deformation sensor 20 and the radial deformation sensor 21 is placed in the inner pressure chamber 8. Then, the inner pressure chamber 8 is placed inside the outer pressure chamber 9, and the upper pressure head 10 and the lower pressure head 12 are driven close to each other by the axial pressure driving member to squeeze the rock sample 11, so as to provide the axial force for the rock sample 11 in the test process. At the same time, a liquid is injected into the outer pressure chamber 9 to provide confining pressure for the rock sample 11, so as to realize the mechanical triaxial test of the rock sample 11. After the test is completed, the lifting mechanism is used for driving the inner pressure chamber 8 to rise, so that the inner pressure chamber 8 is separated from the outer pressure chamber 9, and then the rock sample 11 is taken out from the inner pressure chamber 8. Therefore, when using the rock mechanics triaxial testing machine provided by the present application, it is not necessary to repeatedly fill and drain the outer pressure chamber 9 with liquid. Instead, the rock sample 11 is taken and placed by taking out the inner pressure chamber 8 from the outer pressure chamber 9, which greatly shortens the time for taking and placing the rock sample 11.

In the rock mechanics triaxial testing machine, the inner pressure chamber 8 is nested the outer pressure chamber 9, and the inner pressure chamber 8 is used for quickly placing rock test samples. This design reduces the time for placing the rock test samples 11, reduces the time for filling and draining the liquid in the outer pressure chamber 9, and greatly improves the test efficiency. The outer pressure chamber 9 is used for bearing the counterforce of the axial pressure and the confining compression. Compared with the pillar-type counterforce frame structure of the traditional rock mechanics triaxial testing system, this design ensures that the counterforce mechanism has sufficient rigidity and may greatly reduce the size of the counterforce mechanism.

To sum up, the rock mechanics triaxial testing machine may realize the miniaturization of the rock mechanics triaxial testing system, facilitate the operation, reduce the test time and improve the test efficiency by more than 50%.

In a specific embodiment, the lifting mechanism includes a lifting rod 6 and a lifting drive member. The lower end of the lifting rod 6 is fixedly connected with the top of the inner pressure chamber 8. Specifically, a lower end of the lifting rod 6 and a top of the inner pressure chamber 8 may be connected by screwing, clamping or welding. The lifting drive member may drive the lifting rod 6 to lift. When the lifting drive member drives the lifting rod 6 to lift, the lifting rod 6 drives the inner pressure chamber 8 to lift together, so as to drive the inner pressure chamber 8 out of or into the outer pressure chamber 9.

Further, the lifting mechanism further includes a connecting plate 5, and the lifting rod 6 and an output end of the lifting drive member are fixedly connected with the connecting plate 5. In other words, the lifting rod 6 and the output end of the lifting drive member are relatively fixed by the connecting plate 5. The lifting rod 6 and the connecting plate 5 may be connected by screwing, clamping or welding. The output end of the lifting drive member and the connecting plate 5 may be connected by screwing, clamping or welding, which is not limited here.

In this embodiment, in order to ensure the inner pressure chamber 8 to move up and down more smoothly, it further includes a guide post 4 passing through the connecting plate 5, and the connecting plate 5 slides along the guide post 4 when moving up and down. The lifting drive member drives the connecting plate 5 to slide along the guide post 4 and simultaneously lift the connecting plate 5, and then the connecting plate 5 drives the lifting rod 6 and the inner pressure chamber 8 to lift.

The lifting drive member may be a lifting cylinder or a linear motor.

The rock mechanics triaxial testing machine includes a protective cover 1 and a support base 3, and the guide post 4 may be fixedly connected with the protective cover 1 or the support base 3. The guide post 4 and the connecting plate 5 are arranged in the protective cover 1, and the outer pressure chamber 9, the inner pressure chamber 8, the axial pressure driving member and other components are arranged in the support base 3. The support base 3 includes a welded steel frame, a panel and a spring damping shock absorber. The welded steel frame and panel are used for supporting the main engine of the testing machine and the protective cover 1, and the spring damping shock absorber is used for reducing the vibration damage of the rock mechanics triaxial testing machine during vehicle transportation. The protective cover 1 is used for protecting the safety of the main engine of the testing machine and the personnel during the test. The protective cover 1 may be a metal protective cover.

Of course, in the above embodiments, the output end of the lifting drive member may also be directly and fixedly connected with the top wall of the inner pressure chamber 8, which is not limited here.

In another specific embodiment, an upper end of the outer pressure chamber 9 has an internal thread hole, and the rock mechanics triaxial testing machine further includes a rotating nut 7 matched with the internal thread hole, the rotating nut 7 is provided with a central through hole, and the lifting rod 6 is threadedly matched with the central through hole of the rotating nut 7. In this embodiment, the upper end of the outer pressure chamber 9 is plugged by using the rotating nut 7. When the inner pressure chamber 8 needs to be taken out, the rotating nut 7 is rotated to separate it from the upper end of the outer pressure chamber 9, and then the lifting mechanism can drive the inner pressure chamber 8 to lift.

In the above embodiment, the rotating handle 2 may be fixedly arranged on the upper side of the rotating nut 7, and the rotating nut 7 may be rotated by driving the handle.

Of course, it is also possible to set a cover at the upper end of the outer pressure chamber 9, and the cover is provided with a central through hole for the lifting rod 6 to pass through, and the cover is clamped with the upper side of the outer pressure chamber 9, which is not limited here.

Preferably, the communication hole on the side wall of the inner pressure chamber 8 may have any shape such as a rectangle shape, a circle shape, an ellipse shape, etc. The thermoplastic pipe encapsulating the upper pressure head 10, the rock sample 11 and the lower pressure head 12 may be put into or taken out of the inner pressure chamber 8 through the communication hole. Preferably, multiple communication holes may be provided, and the multiple communication holes may be evenly distributed along the circumferential direction.

In order to ensure the thermoplastic pipe to be encapsulated with the upper pressure head 10, the rock sample 11 and the lower pressure head 12 is in a vertical state after being placed in the inner pressure chamber 8, a ball joint 16 may be arranged on the top wall of the inner pressure chamber 8. The upper pressure head 10 abuts against the ball joint 16, and the ball joint 16 may adjust the unevenness of the upper and lower end faces of the sample.

Furthermore, in order to obtain the axial pressure force in real time, a load sensor 17 is arranged between the ball joint 16 and an inner top wall of the inner pressure chamber 8. The load sensor 17 provides data acquisition of stress and strain of the sample during system loading.

In another specific embodiment, an axial pressure through hole is provided on a bottom wall of the inner pressure chamber 8. The axial pressure driving member includes a telescopic oil cylinder, and a piston 13 of the telescopic oil cylinder may pass through the axial pressure through hole to squeeze the lower pressure head 12. The piston 13 of the telescopic cylinder moves up and down, so as to drive the lower pressure head 12 to move up and further make the lower pressure head 12 squeeze the rock sample 11.

In the above embodiment, the piston 13 of the telescopic cylinder drives the lower pressure head 12 to move upwards, while the upper pressure head 10 abuts against the ball joint 16.

The piston 13 of the telescopic cylinder includes a piston body and an intermediate connector 13a fixed with an upper end of the piston body.

In order to locate the thermoplastic pipe encapsulated with the upper pressure head 10, the rock sample 11 and the lower pressure head 12, one of the piston end of the telescopic cylinder and the bottom end of the lower pressure head 12 is provided with a positioning protrusion and the other of the piston end of the telescopic cylinder and the bottom end of the lower pressure head 12 is provided with a positioning groove. The positioning protrusion is matched with the positioning groove to position the lower pressure head 12.

In order to monitor the upward displacement of the upper pressure head 10 in real time, the axial pressure driving member further includes a displacement sensor 15 for detecting the displacement of the piston 13. The displacement of the piston 13 is adjusted according to the data feedback of the displacement sensor 15.

The axial pressure driving member may also be a linear motor, a worm gear mechanism, etc., which is not limited here.

In order to facilitate the use of the rock mechanics triaxial testing machine in the field and other occasions, the bottom of the rock mechanics triaxial testing machine is provided with a damping pad 14, which is used for reducing the vibration damage of the rock mechanics triaxial testing machine during vehicle transportation.

When testing, the axial pressure driving member, lifting drive member, load sensor 17 and displacement sensor 15 may be connected with a computer in communication, and the computer controls the working state of the axial pressure driving member and lifting drive member according to the data fed back by the load sensor 17 and displacement sensor 15.

The above embodiments are described in a progressive manner. Each of the embodiments is mainly focused on describing its differences from other embodiments, and references may be made among these embodiments with respect to the same or similar parts.

The above description of the disclosed embodiments enables those skilled in the art to implement or use the present application. Various modifications to the embodiments are apparent to the person skilled in the art, and the general principle herein can be implemented in other embodiments without departing from the spirit or scope of the present application. Therefore, the present application will not be limited to the embodiments described herein, but should be in accordance with the broadest scope consistent with the principle and novel features disclosed herein.

In the description of this specification, description with reference to the terms "one embodiment", "example", "specific example", etc. means that specific features, structures, materials or characteristics described in connection with this embodiment or example are included in at least one embodiment or example of the present application. In this specification, the schematic expressions of the above terms do not necessarily refer to the same embodiments or examples. Furthermore, the specific features, structures, materials or characteristics described may be combined in any one or more embodiments or examples in a suitable manner.

The invention claimed is:

1. A rock mechanics triaxial testing machine, comprising:
    an outer pressure chamber and an inner pressure chamber located inside the outer pressure chamber, wherein a side wall of the inner pressure chamber is provided with a communication hole for communicating with the outer pressure chamber;
    an upper pressure head and a lower pressure head which is placeable inside the inner pressure chamber;
    an axial pressure driving member, wherein the axial pressure driving member is configured to drive the upper pressure head and lower pressure head to approach each other for squeezing the rock sample;
    an axial deformation sensor for detecting axial compressed deformation of the rock sample;
    a radial deformation sensor for detecting radial expansive deformation of the rock sample;
    a lifting mechanism, wherein the lifting mechanism is configured to drive the inner pressure chamber to rise and fall,
    wherein an axial pressure through hole is defined on a bottom wall of the inner pressure chamber,
    the axial pressure driving member comprises a telescopic oil cylinder, and a piston of the telescopic oil cylinder is configured to pass through the axial pressure through hole to squeeze the lower pressure head.

2. The rock mechanics triaxial testing machine according to claim 1, wherein the lifting mechanism comprises:
    a lifting rod, wherein a lower end of the lifting rod is fixedly connected with a top of the inner pressure chamber;
    a lifting drive member, wherein the lifting drive member is configured to drive the lifting rod to rise and fall.

3. The rock mechanics triaxial testing machine according to claim 2, further comprising a connecting plate, wherein the lifting rod and an output end of the lifting drive member are fixedly connected with the connecting plate.

4. The rock mechanics triaxial testing machine according to claim 3, further comprising a guide post passing through the connecting plate, wherein the connecting plate slides along the guide post when the connecting plate rises or falls;
    the lifting drive member is a lifting oil cylinder.

5. The rock mechanics triaxial testing machine according to claim 2, wherein an upper end of the outer pressure chamber has an internal threaded hole, and the rock mechanics triaxial testing machine further comprises a rotating nut matched with the internal threaded hole, the rotating nut is provided with a central through hole, and the lifting rod is in threaded fit with the central through hole of the rotating nut.

6. The rock mechanics triaxial testing machine according to claim 1, wherein the axial deformation sensor comprises an axial rod end and an axial sleeve end, and the axial rod end is fixed to the upper pressure head, and the axial sleeve end (202) is fixed to the lower pressure head, when the rock sample is squeezed, the upper pressure head and the lower pressure head are approaching each other, which makes the axial rod end and the axial sleeve end approach each other, and a position of an axial rod in an axial sleeve is varied, and the axial compressed deformation is calculated according the position variation.

7. The rock mechanics triaxial testing machine according to claim 1, wherein the radial deformation sensor comprises a chain, a radial rod end, and a radial sleeve end, and when the rock sample is squeezed, the rock sample expends in a radial direction, and the radial expansive deformation is calculated according the expending deformation,
    wherein the radial rod end and the radial sleeve end are provided at the longitudinally opposite ends of the chain, respectively, and the chain is configured to enclose the rock sample and the radial rod end is configured to be able to insert into the radial sleeve end.

8. The rock mechanics triaxial testing machine according to claim 1, wherein a ball joint is provided on a top wall of the inner pressure chamber; a load sensor is provided between the ball joint and the top wall of the inner pressure chamber;
    the communication hole is rectangular, round or oval, and the thermoplastic pipe encapsulating the upper pressure head, the rock sample and the lower pressure head is put into or taken out of the inner pressure chamber through the communication hole.

9. The rock mechanics triaxial testing machine according to claim 1, wherein one of an end of the piston of the telescopic oil cylinder and a bottom end of the lower pressure head is provided with a positioning protrusion and the other end of the piston of the telescopic oil cylinder and the bottom end of the lower pressure head is provided with a positioning groove.

10. The rock mechanics triaxial testing machine according to claim 1, wherein the axial pressure driving member further comprises a displacement sensor for detecting the displacement of the piston.

11. The rock mechanics triaxial testing machine according to claim 1, wherein a damping pad is arranged at the bottom of the rock mechanics triaxial testing machine.

* * * * *